United States Patent
Bachmann et al.

(10) Patent No.: US 6,631,860 B2
(45) Date of Patent: Oct. 14, 2003

(54) GUIDE MEMBER FOR A LIQUID JET TO BE DEFLECTED

(75) Inventors: Christian Bachmann, Ellikon (CH); Emil Fehr, Berg am Irchel (CH); Adrian Faust, Balterswil (CH)

(73) Assignee: Sulzer Chemtech AG, Winterthur (CH)

( * ) Notice: Subject to any disclaimer, the term of this patent is extended or adjusted under 35 U.S.C. 154(b) by 82 days.

(21) Appl. No.: 09/839,334

(22) Filed: Apr. 20, 2001

(65) Prior Publication Data

US 2001/0038044 A1 Nov. 8, 2001

(30) Foreign Application Priority Data

May 8, 2000 (EP) .............................. 00810389

(51) Int. Cl.[7] .............................. B05B 1/14; B05B 1/00; B05B 1/26; B05B 1/34; A62C 31/02
(52) U.S. Cl. ...................... 239/590; 239/589; 239/597; 239/601; 239/461; 239/476; 239/510; 239/518
(58) Field of Search ................ 239/461, 463, 239/468, 476, 486, 487, 510, 518, 589, 590, 597, 601; 261/97

(56) References Cited

U.S. PATENT DOCUMENTS

| | | | | |
|---|---|---|---|---|
| 3,044,270 A | * | 7/1962 | Biever | 62/50.7 |
| 4,855,089 A | * | 8/1989 | Michels | 261/97 |
| 4,981,265 A | * | 1/1991 | Buhlmann | 239/193 |
| 5,192,465 A | * | 3/1993 | Petrich et al. | 261/97 |
| 5,906,773 A | * | 5/1999 | Hausch et al. | 261/97 |
| 6,293,526 B1 | * | 9/2001 | Fischer et al. | 261/97 |

FOREIGN PATENT DOCUMENTS

| | | |
|---|---|---|
| WO | WO 96/26778 | 9/1996 |
| WO | WO 99/06130 | 2/1999 |

* cited by examiner

*Primary Examiner*—Michael Mar
*Assistant Examiner*—Darren Gorman
(74) *Attorney, Agent, or Firm*—Townsend and Townsend and Crew LLP

(57) ABSTRACT

The guide member (1) for a liquid jet (30) to be deflected allows a liquid (3) after flowing out of a container (2) to be deflected onto a target (5; 7) which is located below the container. The deflecting takes place by means of a shaped material plate (10; 10a, 10b) which is arranged ahead of an outlet opening (20) of the container and which reshapes and further conducts the jet (30) in such a manner that the liquid is conveyed to the target at a lower end (17) of the shaped material plate. At the location ahead of the outlet opening (20), where the liquid jet (30) is incident onto the shaped material plate (10), a first and a second piece of surface (11 and 12 respectively) of the material plate form a mouth region (13) in which the first piece of surface (11) deflects the liquid (3) transversely with respect to the vertical, whereas the second piece of surface (12) is provided as a catcher for squirts. The first piece of surface merges into a channel (14) in which the liquid is guided downwards. In this the wall of the second piece of surface divides the channel off from the mouth region. In modified form the guide member can also be assembled from a plurality of shaped material plates.

9 Claims, 3 Drawing Sheets

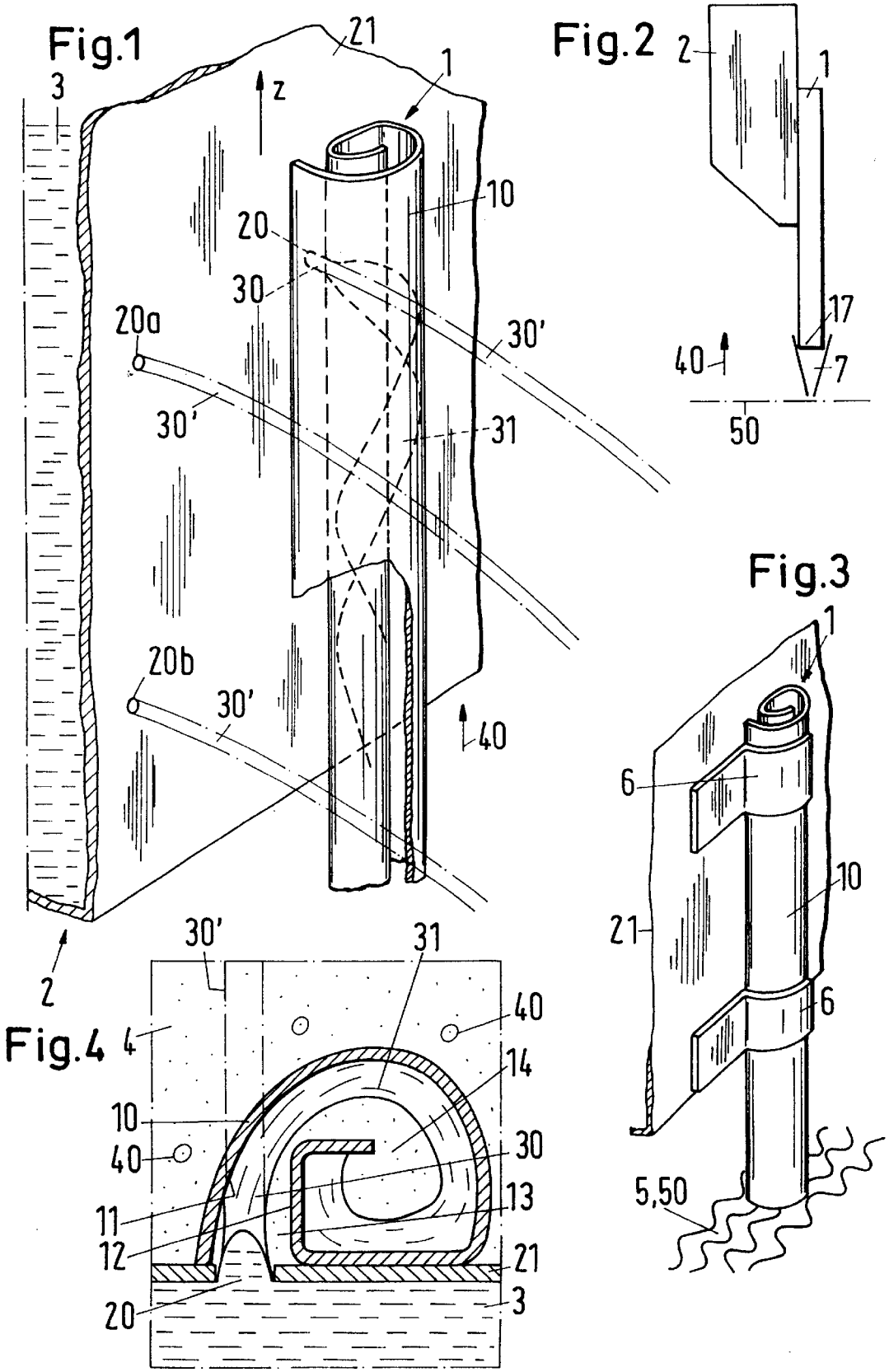

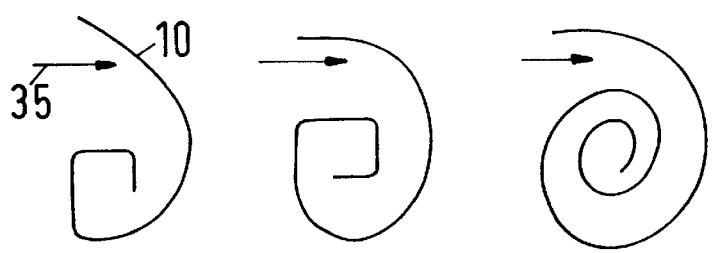
Fig.5
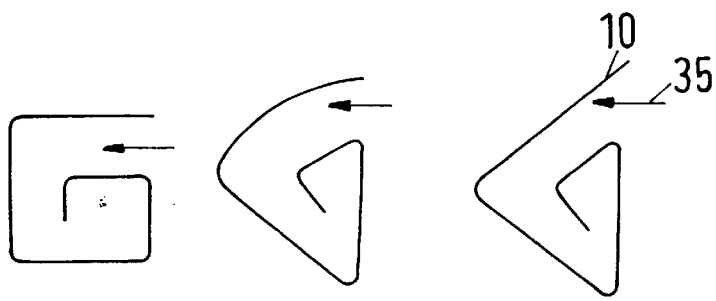
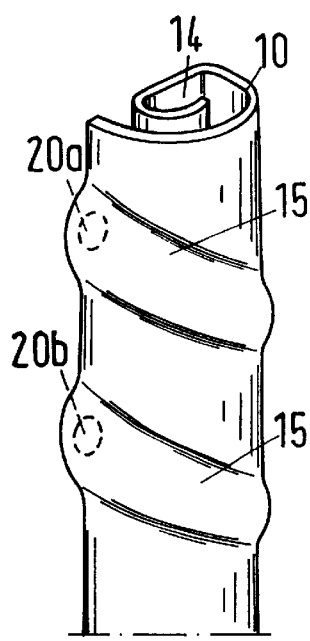
Fig.6
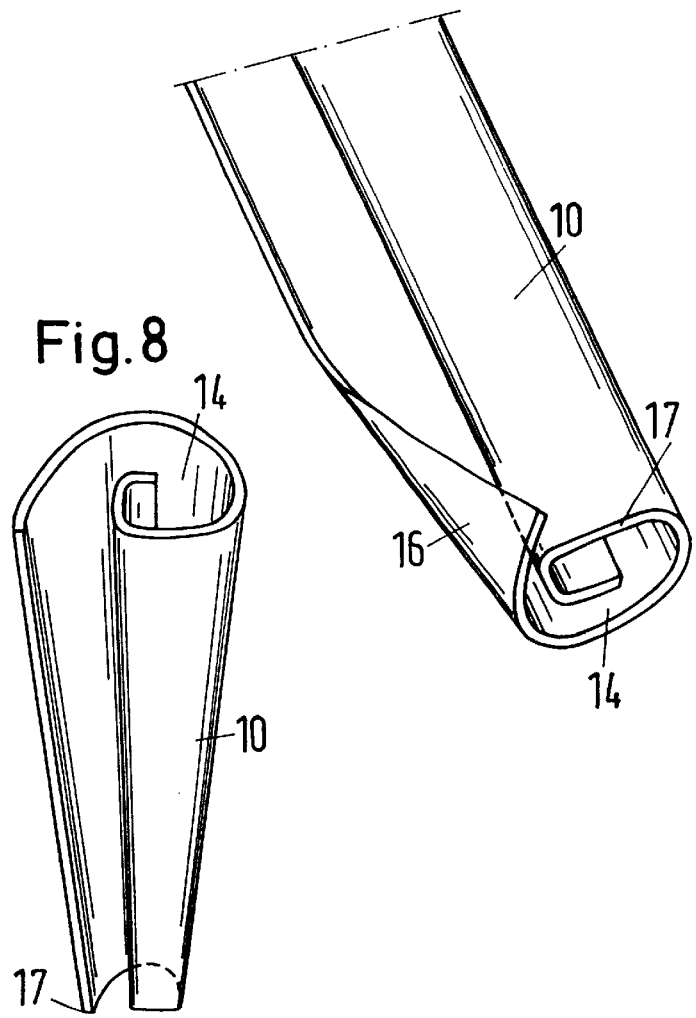
Fig.7
Fig.8

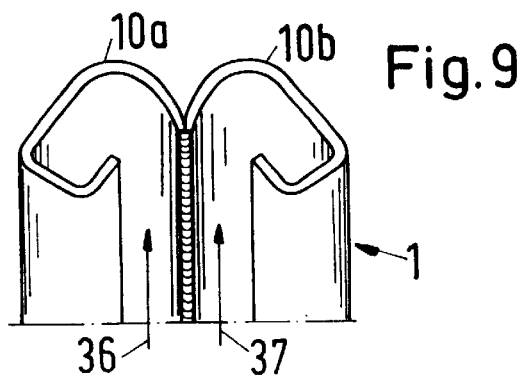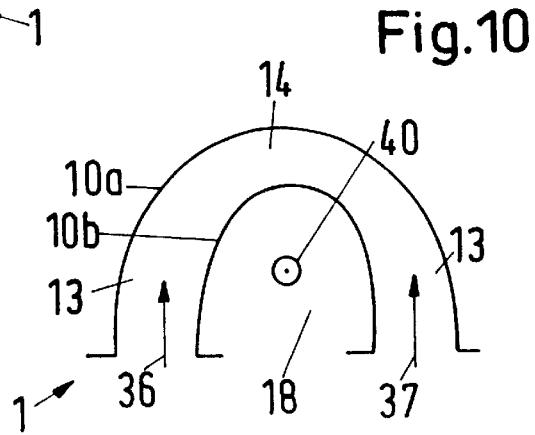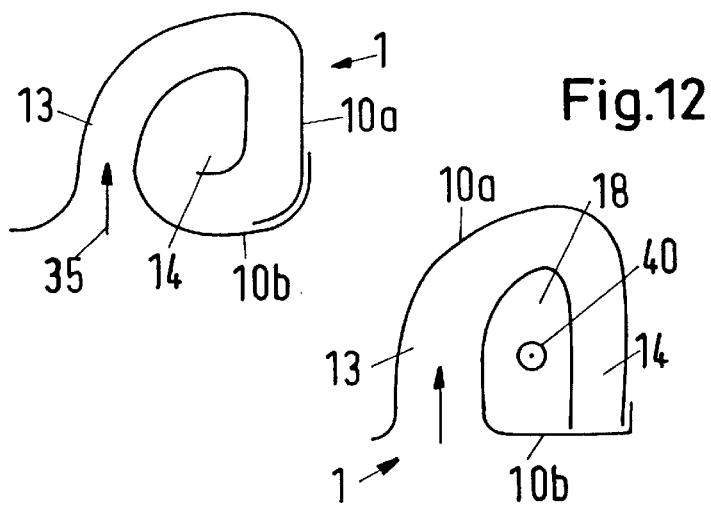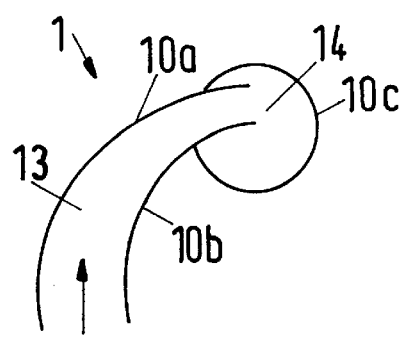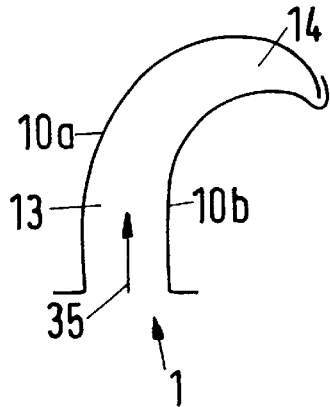

GUIDE MEMBER FOR A LIQUID JET TO BE DEFLECTED

BACKGROUND OF THE INVENTION

The invention relates to a guide member for a liquid jet flowing out of a container to be deflected onto a target located below the container. It also relates to counter-flow columns with liquid distributors in which the liquid flows off via guide members and to uses of apparatuses which contain guide members and which can be used for processes in the chemical industry and in petrochemistry and/or for example for decompositions of gas mixtures, in particular for distillation, reactive distillation, absorption or extraction, with material and heat exchange processes as well as chemical reactions taking place or with it being possible for them to take place.

In a counter-flow column in which for example a distillative material separation is carried out by means of an ordered packing, a gas can flow upwards through the packing with a high speed. In the use of unsuitable liquid distributors the rapidly flowing gas separates off fine drops from the distributor and carries the former along with it. The liquid to be distributed therefore does not arrive onto the packing without losses. From EP 0 282 753 a liquid distributor is known in which liquid emerges from outlet openings of distributor troughs and is incident in jet form on baffle plates of guide members (called guide walls there). The liquid arrives in the guide member with a relatively high speed onto the baffle plate, is distributed on the latter as a parabolic film and then flows from a drip-off edge onto the packing. A plurality of parallel distributor troughs subdivides the gas which flows upward out of the packing into a plurality of partial flows, between which back pressure zones develop. The drip-off edges of the guide members are arranged beneath the distributor troughs within the back pressure zones of the gas flow. It is thereby largely prevented that droplets are taken along by the gas flow, A disadvantage of the known guide members is that they relatively strongly narrow the cross-sectional area which is available between the distributor troughs for the transport of the gas and that they thus cause an increase in the pressure loss which is connected with the narrowing.

SUMMARY OF THE INVENTION

It is an object of the invention to create a guide member by means of which after flowing out of a container the liquid can be deflected onto a target which is arranged below the container and by means of which—in comparison with the known guide member—a greater proportion of the cross-section is available for the gas transport. In this it must be ensured at the same time that no squirts arise which can be carried along by the gas flow. With the enlargement of the cross-section which is available for the gas transport the flow speed is also reduced, which additionally reduces the danger of carrying liquid droplets along. At the same time the guide member of the invention enables very large amounts of liquid to be carried out without back pressure effects arising.

The guide member in accordance with the invention for a liquid jet to be deflected allows a liquid after flowing out of a container to be deflected onto a target which is located below the container. The deflecting takes place by means of a shaped material plate which is arranged ahead of an outlet opening of the container and which reshapes and further conducts the jet in such a manner that the liquid is conveyed to the target at a lower end of the shaped material plate. At the location ahead of the outlet opening where the liquid jet is incident onto the shaped material plate, a first and a second piece of surface of the material plate form a mouth region in which the first piece of surface deflects the liquid transversely with respect to the vertical, whereas the second piece of surface is provided as a catcher for squirts. The first piece of surface merges into a channel in which the liquid is guided downwards. In this the wall of the second piece of surface divides the channel off from the mouth region. In modified form the guide member can also be assembled from a plurality of shaped material plates.

The guide member can also be used for column bases which are located between filler body sections of a column packing. In these column bases a liquid collector—for example a flue base collector—has at the same time the function of a liquid distributor. The guide members in accordance with the invention can be arranged in the interior of gas conducting flues ahead of outflow holes which are located in vertical flue walls.

The present invention includes advantageous embodiments of the guide member, counter-flow columns with such guide members, and columns and apparatuses which use such guide members.

In the following the invention will be explained with reference to the drawings.

BRIEF DESCRIPTION OF THE DRAWINGS

FIG. 1 shows a guide member in accordance with the invention,

FIG. 2 illustrates a guide member which is attached to a distributor trough above a packing, FIG. 3 shows the guide member of FIG. 1 with securing means, FIG. 4 is a cross-section through the guide member, FIG. 5 shows diverse cross-sections through guide members which in each case have a spiral-shaped profile, FIG. 6 shows a guide member with lateral outward bulges, FIG. 7 shows a part of a guide member which is conically shaped at the lower end, FIG. 8 shows a guide member which is conically shaped over its entire height, FIG. 9 shows a section of a "twin guide member", FIG. 10 shows a profile of a "ring gap guide member", FIGS. 11–13 show profiles pertaining to guide members which are assembled from two shaped metal plates, and FIG. 14 shows a profile of a three-piece guide member.

DESCRIPTION OF THE PREFERRED EMBODIMENTS

FIG. 1 shows a guide member 1 in accordance with the invention which is attached to a container 2, a distributor trough. FIG. 2 is a schematic illustration pertaining to a use of the guide member 1, which is attached to the distributor trough 2 above the upper end 50 of a column packing 5 (see FIG. 3). The flow of a gas which is conducted in counter-flow is indicated by an arrow 40. The base of the container 2 can lie on a horizontal plane; it can also—as illustrated in FIG. 2—be formed at an inclination in order to oppose a smaller resistance to the gas flow 40.

In the absence of guide members 1 a liquid 3, which emerges out of the container 2 from outlet openings 20, 20a and 20b as jets 30, forms liquid jets 30' which are illustrated in chain-dotted lines. With the guide member 1 the liquid 3 is deflected after the flowing out onto a target which is arranged below the container 2. The target is the packing 5 or a fine distributor device 7 which is arranged at the lower end 17 of the guide member 1. The guide member 1 can be firmly or removably attached to the wall 21 of the container 2 using for example strap-like securing means 6. A removable securing is advantageous in regard to a cleaning of the container 2.

The deflection of the liquid jet 30 takes place by means of a shaped material plate 10 which is arranged ahead of the outlet opening 20 of the container 2 and which reshapes and further conducts the jet 30 in such a manner that the liquid 3 is conveyed to the target 5 or 7 at the lower end 17 of the material plate 10.

As FIG. 4 shows with reference to a cross-section, the sectional plane of which extends perpendicular to the vertical (z-direction, FIG. 1) the liquid jet 30 is incident on the shaped material plate 10 in a mouth region 13. This mouth region 13 is formed ahead of the outlet opening 20 of a first piece of surface 11 and a second piece of surface 12. The first piece of surface 11 deflects the liquid 3 transversely with respect to the vertical, with a flow 31 developing. The second piece of surface 12 has the function of a catcher for squirts, which are incident on this piece of surface 12 and flow off along it as a liquid film. The first piece of surface 11 merges into a channel 14 in which the liquid 3 is guided downward. The guide member 1 screens the liquid 3 against a gas 4 which is conducted in counter-flow. In this the liquid jet 30 and the flow 31 partly block off the path of the gas 4 within the guide member 1, so that the gas flow 40 is largely restricted to the outer region, where there is no contact between the gas 4 and the liquid 3.

One outlet opening 20 or two outlet openings 20a and 20b or also more can be provided. If a plurality of outlet openings is present, then these are as a rule arranged vertically one above the other.

The wall of the second piece of surface 12 also has a separation function: If a plurality of outlet openings 20a, 20b is present, then the wall of the piece of surface 12 keeps the flow 31 away from the flows 30 which emerge further below.

The first piece of surface 11 is arranged with respect to the outlet opening 20 or the outlet openings 20a, 20b in such a manner that the emerging liquid jet 30 is approximately tangentially incident onto the material plate 10. Then the liquid 3 flows through the channel 14 as flow 31. The flowing of the flow 31 has a helical shape at least in an upper part of the guide member 1.

shaped material plate 10 has—in a plane transverse to the vertical or longitudinal direction of the channel 14—a cross-section with spiral-shaped profile. Different examples are illustrated in FIG. 5. An arrow 35 indicates in each case the location and the direction of the inflowing liquid 3.

The guide member 1 can have a variably formed cross-section. It can have at the level of the outlet opening 20 a lateral outward bulge which is provided for a deflection of the flow 31 (FIGS. 1, 4). FIG. 6 shows an example with outward bulges 15 for two liquid jets which flow out from the outlet openings 20a and 20b. In order to largely prevent the gas 4 from flowing into the mouth region 13 or into the channel 14 and in order to bring the flow 31 into a compact form, the guide member 1 can be formed in such a manner that the cross-section contracts downwardly. In this the contraction can be provided only in a vicinity 16 of the lower end 17, see FIG. 7; or it can be provided over the entire height, see FIG. 8. Thanks to the compact shape the flow 31 offers less surface of attack to the gas counter-flow 40.

The guide member 1 in accordance with the invention can be assembled from two or more shaped material plates. FIGS. 9 to 14 show various examples. In the exemplary embodiment of FIG. 9 two guide members with shaped material plates 10a and 10b of the above-described kind are welded together to form a "twin guide member" 1. With this guide member 1 two adjacent liquid jets 36 and 37 which emerge at the same level can be deflected. (The "twin guide member" 1 can also be shaped from a single material plate 10.)

The exemplary embodiment of FIG. 10 is likewise provided for two liquid jets 36 and 37. Its cross-sectional profile shows a ring-gap-like channel 14, into which the liquid 3 enters from the sides in two mutually oppositely directed flows. A central region 18 of the guide member 1 remains free of liquid 3. In this region 18 a flow 40 of the gas 4 can be let through without hindrance.

The guide member 1 in FIG. 11 has a spiral-shaped cross-section and is assembled from two material plates 10a and 10b. A variant is shown in FIG. 12, in which however, as was already the case in the example of FIG. 10, a central region 18 with a gas flow 40 which has been let through is present. A further two-piece variant is illustrated in FIG. 13. The guide member 1 of FIG. 14 is assembled from three parts: the mouth region 13 is formed by the material plates 10a and 10b, the channel 14 by a laterally slit tube 10c.

The mouth regions 13 of the guide members 1 are formed in the examples of FIGS. 11 to 14 in each case as a curved alley. Their horizontal width must be greater than the diameter of the associated outlet opening 20 of the container 2. The alley width is advantageously approximately equal to the diameter of the outlet opening 20, so that within the guide member 1 the path for the upwardly flowing gas 4 is practically completely cut off.

What is claimed is:

1. Guide member for liquid jets to be deflected after flowing out of a plurality of outlet openings arranged substantially vertically above each other in a container onto a target which is located below the container comprising a shaped material plate which is arranged relative to the outlet openings of the container so that the liquid jets impact the shaped material plate which reshapes and further conducts the liquid jets in such a manner that the liquid of the jets is conveyed at a lower end of the shaped material plate to the target, the shaped material plate having a first piece of surface and a second piece of surface forming a mouth region in which the first piece of surface deflects the liquid transversely with respect to the vertical, the second piece of surface forming a catcher for liquid squirts, the first piece of surface merging into a channel in which the liquid is guided downwards, the first piece of surface being arranged with respect to the outlet openings so that the liquid jets emerging from the outlet openings are incident at least approximately tangentially on the material plate and then flow helically through the channel.

2. Guide member in accordance with claim 1 wherein the shaped material plate has a cross-section with a spiral-shaped profile in a direction transverse to the longitudinal direction of the channel.

3. Guide member in accordance with claim 1 wherein the shaped material plate has a cross-section which is formed to be at least partly variable in a longitudinal direction of the channel, the first piece of surface has a lateral outward bulge at a level of the outlet openings, and the shaped material plate has a cross-section contracting downwardly over at least a portion of a height of the shaped material plate and at least in a vicinity of the lower end.

4. Guide member for a liquid jet to be deflected after flowing out of an outlet opening in a container onto a target which is located below the container comprising a shaped material plate which is arranged relative to the outlet opening of the container so that the liquid jet impacts the shaped material plate which reshapes and further conducts the liquid jet in such a manner that the liquid of the jet is conveyed at a lower end of the shaped material plate to the target, the shaped material plate having a first piece of surface and a second piece of surface forming a mouth region in which the first piece of surface deflects the liquid transversely with respect to the vertical, the second piece of surface forming a catcher for liquid squirts, the first piece of surface merging into a channel in which the liquid is guided downwards, the shaped material plate having a cross-section with a spiral-shaped profile in a direction transverse to a longitudinal direction of the channel.

5. Guide member in accordance with claim 4 wherein the first piece of surface is arranged with respect to the outlet opening so that the liquid jet emerging from the outlet opening is incident at least approximately tangentially on the material plate and then flows helically through the channel, and including a plurality of outlet openings in the container from which liquid jets emerge and impact the shaped material plate.

6. A counter-flow column comprising guide members for liquid jets to be deflected after flowing out of outlet openings in containers onto a target which is located below the containers including shaped material plates which are arranged relative to the outlet openings of the containers so that the liquid jets impact the shaped material plates which reshape and further conduct the liquid jets in such a manner that the liquid of the jets is conveyed at lower ends of the shaped material plates to the target, the shaped material plates each having a first piece of surface and a second piece of surface forming a mouth region in which the first piece of surface deflects the liquid from the jets transversely with respect to the vertical, the second piece of surface forming a catcher for liquid squirts, the first piece of surface merging into a channel in which the liquid is guided downwards, the containers forming a liquid distributor from which liquid is distributed against an upwardly directed gas flow onto one of a filler body and a filler body section of a column packing, the guide members being arranged generally opposite the outlet openings and the liquid jets flowing out of the outlet openings being intentionally deflectable by means of the guide members onto one of the filler body and fine distributor elements arranged above the filler body.

7. Column in accordance with claim 6 wherein the guide members have mouth regions formed as a curved alley, a horizontal width of which being no less than approximately equal to a diameter of an associated outlet opening in the container.

8. Column in accordance with claim 6 including attachment devices removably attaching the guide members to the containers of the liquid distributor.

9. Column in accordance with claim 6 wherein the filler body section has upper and lower filler body sections, and a base arranged between the upper and lower filler body sections for collecting liquid from the upper section in a buffer chamber and distributing the collected liquid onto the lower section; and including flues serving as passages for a gas transport through the buffer chamber, the guide members being arranged within the flues generally opposite of outlet openings.

* * * * *